Aug. 15, 1967     W. H. SCHWARTZ     3,335,461
RECIPROCATING SCREW INJECTION MOLDING MACHINE
Filed June 12, 1964
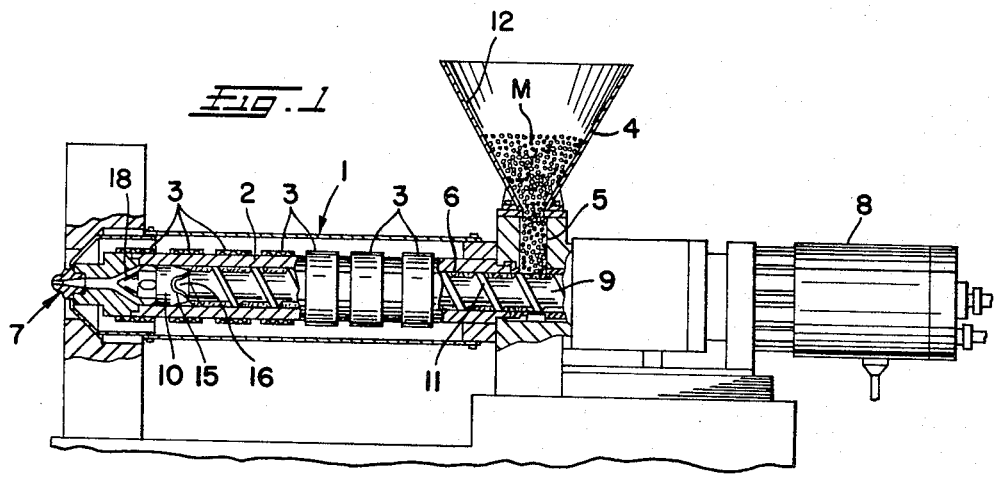
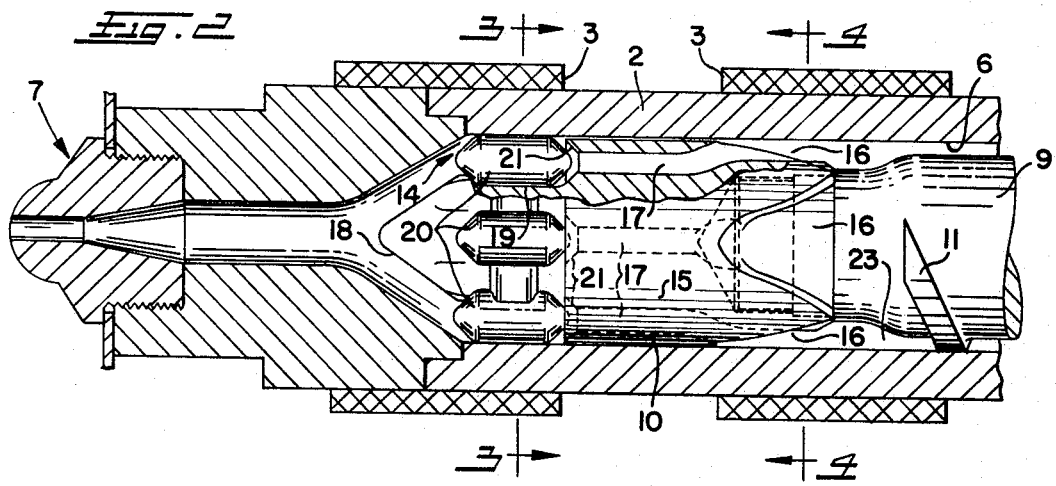
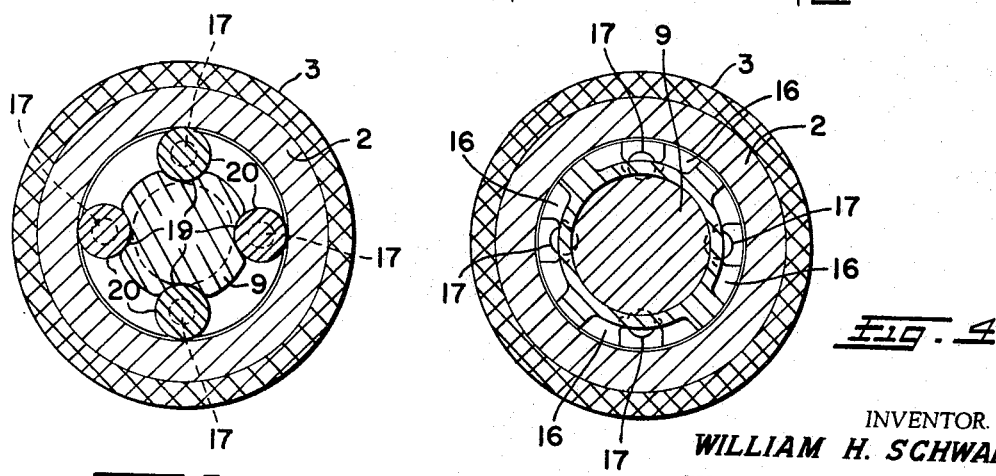
INVENTOR.
WILLIAM H. SCHWARTZ
BY
*Oberlin, Maky & Donnelly*
ATTORNEYS

United States Patent Office 3,335,461
Patented Aug. 15, 1967

3,335,461
RECIPROCATING SCREW INJECTION MOLDING MACHINE
William H. Schwartz, University Heights, Ohio, assignor to Lester Engineering Company, Cleveland, Ohio, a corporation of Ohio
Filed June 12, 1964, Ser. No. 374,621
10 Claims. (Cl. 18—30)

The present invention relates generally as indicated to a reciprocating screw injection molding machine and more particularly to the piston head on the rotating and reciprocating feed screw.

As is well known in the art, in an injection molding machine of the reciprocating screw type, the injection piston of a conventional injection cylinder is replaced by an extruder screw having a piston head adjacent the outlet of the injection cylinder. The rotation of the screw in the cylinder and axial retraction of the screw feeds material through the injection cylinder from the feed hopper adjacent one end of the cylinder toward the discharge outlet at the other end of the cylinder, and because of the thorough mixing and shearing action of said feed screw, good plasticization and homogenization of the material is accomplished. As the material is melted, it is deposited in front of the feed screw at the nozzle end of the injection cylinder, the feed screw retracting as the material builds up to desired shot size. When enough material has accumulated to fill a mold, the feed screw is advanced axially toward the nozzle, whereby the material in front of the piston head thereof is injected into the mold. In order to prevent back flow of the material during the injection stroke of the feed screw, a check valve is provided to permit flow from the screw flight to the chamber in front of the end of the feed screw as the feed screw is being retracted and rotated. If the check valve aforesaid is located in the center of the feed screw, then the end of the feed screw has a blunt end which is not conducive to streamline flow and creates an area whereat material may hang up and there become charred and burned to contaminate the material flowing therepast. Also such central check valve arrangement increases the starting up time since the central passage is exteriorly heated from the injection cylinder. It is also known to provide a piston head in the form of a sleeve having an axial lost motion connection with the feed screw, said sleeve being sealed with a shoulder on the feed screw during the injection stroke.

In known types of reciprocating screw injection molding machines of the character indicated, the feed screw may have a feeding rib portion of length twenty or more times the diameter and, of course, the outside diameters of the feeding rib and the piston head must be a relatively close fit in the cylinder bore in order to prevent leakage and with such relatively great length the turning of the piston head and adjacent portion of the feeding rib in the cylinder bore causes wear at that end of the feed screw, whereas the portion of the feed screw adjacent the feed opening may be supported in suitable bearings.

In view of the foregoing, it is accordingly one principal object of this invention to provide a novel injection screw having a check valve arrangement having passages extending longitudinally through the piston head of the feed screw near the periphery for quicker start-ups.

It is another object of this invention to provide a molding machine of the character indicated in which check valve members at the piston head end of the injection screw constitute an anti-friction bearing to support the screw centrally in the bore of the injection cylinder and to prevent wear as would otherwise be caused by rotation of said screw in the bore of the injection cylinder.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

In said annexed drawing:

FIG. 1 is a side elevation view partly in cross-section illustrating one form of injection molding machine according to the present invention;

FIG. 2 is a fragmentary cross-section view of the discharge nozzle end of the injection cylinder;

FIG. 3 is a cross-section view taken substantially along the line 3—3, FIG. 2; and FIG. 4 is a cross-section view taken substantially along the line 4—4, FIG. 3.

Referring now more particularly to the drawing, and first to FIG. 1 thereof, the reference numeral 1 denotes a reciprocating screw injection molding machine which comprises the cylinder 2 having electric heater bands 3 or the like therearound. One end of said cylinder 2 is secured to a feed hopper assembly 4 which has an inlet opening 5 which communicates with the bore 6 of the cylinder 2, and at the other end of said cylinder 2 there is provided the conventional nozzle assembly 7 which is adapted to engage the sprue bushing (not shown) of a mold assembly, also not shown.

Rotatable and reciprocable in the cylinder bore 6 as by suitable power means 8, is a combination feed screw-injection plunger 9, the plunger head 10 of which as hereinafter explained in detail, constitutes an antifriction bearing for said feed screw and a check valve assembly which permits flow of the plastic material in one direction only, that is, from the feed screw portion toward the nozzle assembly 7.

The feed screw 9 is provided with a conventional helical rib or flight 11 and, as well known in the art, the lead of said flight 11 may be variable and/or the hub diameter of the feed screw 9 may be of variable diameter to effect desired mixing, smearing, working, shearing, and plasticizing action of the material. Accordingly, as the granular or like plastic material M from the hopper 12 flows into the helical channel defined between the feed screw 9 and the bore 6 of the cylinder 2, it is subjected to mixing and shearing action whereby excellent plasticization and homogenization of the material is accomplished; and moreover, as the material M is advanced toward the left, as viewed in FIG. 1, its contact with the wall of the bore 6 effects melting thereof, the electric heater bands 3 serving to heat the cylinder 2. As the feed screw 9 is rotated and axially moved toward the right, the melted material M is deposited in front of the screw 9 into the progressively enlarging cylindrical chamber 14 adjacent the nozzle assembly 7.

For effecting such flow of the melted material M, the feed screw 9 has screwed or otherwise secured thereto, a piston head 15 which as aforesaid constitutes a check valve assembly and an antifriction bearing for the end of the combination feed screw-injection plunger 9. When the melted material M leaves the end of the flight 11 it is advanced through four channels 16 which gradually change the annular body of material M to four cylindrical streams, the streams being circular openings 17 near the periphery of the plunger head 15 and preferably parallel to the axis thereof so as to be close to the heated cylinder 2. This enables quicker start-ups of the apparatus and prevents freeze up. The plunger head 15 has a streamlined conical tip 18 and adjacent the tip there are cylindrical recesses 19 in which are disposed a corresponding number of cylindrical rollers 20 which have a bearing fit in the bore 6 of the cylinder 2. The rollers 20 have streamlined generally conical ends of which the right-hand ends as viewed in FIG. 2, cooperate with the conical seats 21 at the downstream ends of the plunger head passages 17.

When the screw 9 is rotating and moving toward the right, the melted material M is advanced from the annular chamber 23 through the channels 16 of progressively decreasing circumferential width, through the passages 17 in the plunger head 15 and around the rollers 20 which at that time are away from their seats 21, and into the enlarging cylindrical chamber 14 adjacent the nozzle 7. In ordinary screw type extruders or reciprocating screw injection molding machines, the helical flight 11 is, of course, a fairly close fit in the cylinder bore as is a plunger head at the free or forward end of the screw, and accordingly because of the relatively great length to diameter ratio of such screws the forward end thereof will rub against the bottom of the cylinder bore 6 thus causing wear of the plunger head and/or helical flight. In the present case, the plunger head 15 and flight 11 fits in the bore 6 are yet close fits to prevent leakage of material around the plunger head 15 and around the helical flight 11, but the rollers 20 herein are disposed on a diameter slightly larger than the flight 11 and the plunger head 15, and thus said rollers have rolling contact with the cylinder bore 6 to keep the feed screw accurately centered in the cylinder 2 and to keep the outer surface of the plunger head 15 and the outer surface of the flight 11 out of rubbing contact with the cylinder bore 6. Of course, the drive end of the feed screw 9 will be supported in suitable bearings (not shown) as is well known in the art.

Continuing with the operation of the machine herein, when enough melted material M has accumulated in the nozzle end of the cylinder 2, the plunger 9 rotation is preferably stopped and the plunger 9 is forced by the drive means 8 toward the left as viewed in FIGS. 1 and 2, whereupon the rollers 20 are moved into engagement with the seats 21 to prevent back flow of the material M whereupon the melted material is injected through the nozzle 7 into the mold cavity.

The chief advantage of this type of plasticating system is the excellent thermal uniformity of the melt and the consequent production of stress free molded parts. In addition, plasticating rates can be improved and harder flow materials can be run. In many cases cycle time can be decreased. Color changes as well as material changes can be accomplished without excessive loss of material.

Other modes of applying the principle of the invention may be employed, change being made as regards the details described, provided the features stated in any of the following claims, or the equivalent of such be employed.

I therefore particularly point out and distinctly claim as my invention:

1. An injection molding machine comprising a cylinder having feed and discharge openings; a feed screw having a helical flight therearound; said feed screw being rotatable and axially movable in said cylinder respectively to advance material from said feed opening toward said discharge opening for melting of the material during such advance, and to provide a space of increasing axial length adjacent said discharge opening to receive such melted material; said feed screw having at its discharge end a piston head rotatable therewith and including a check valve assembly therein; said check valve assembly being operative to block return flow of the material as the feed screw is moved axially toward said discharge opening thus to displace the melted material in such space through said discharge opening, said check valve assembly comprising a plurality of check valve members of circular cross-section axially movably carried by said feed screw, said check valve members having rolling contact with said cylinder and thus constituting an antifriction bearing for supporting that end of the feed screw centrally in said cylinder with said piston head and the helical flight of said feed screw out of rubbing contact with said cylinder.

2. The machine of claim 1 wherein said piston head has peripheral channels of progressively decreasing circumferential width toward said discharge opening which merge with a plurality of passages extending generally axially of said piston head and near the periphery of said head, said passages terminating in seats for the respective check valve members.

3. The machine of claim 1 wherein said piston head has peripheral channels of progressively decreasing circumferential width toward said discharge opening which merge with a plurality of passages extending generally axially of said piston head and near the periphery of said head; and wherein said check valve members comprise cylindrical rollers axially movably carried in cylindrical recesses in said piston head for movement into and out of engagement with corresponding seats at the ends of said passages.

4. The machine of claim 1 wherein said piston head has a circular series of passages extending generally axially therethrough near the periphery of said head and terminating in seats for said check valve members.

5. The machine of claim 1 wherein said feed screw has cylindrical recesses receiving said check valve members therein for such axial movement.

6. In a reciprocating screw injection molding machine of the type in which rotation and axial retraction of a feed screw in a cylinder advances material through a check valve assembly in the piston head of said screw into an axially enlarging chamber adjacent the injection nozzle of said cylinder, and in which axial advance of said feed screw in said cylinder closes said check valve assembly for ejection of the material in said chamber through said nozzle, the improvement which comprises providing a check valve assembly including a circular series of check valve members having rolling contact with said cylinder and axially movably carried by said feed screw thus to support that end of said feed screw out of rubbing contact with said cylinder.

7. The machine of claim 6 wherein said check valve members are cylindrical rollers axially movably carried in cylindrical recesses in said feed screw and cooperating with seats at the ends of passages extending generally axially through said piston head.

8. The machine of claim 6 wherein said piston head has peripheral channels of progressively decreasing circumferential width toward said nozzle which merge with a circular series of passages extending generally axially through said piston head; the downstream ends of said passages having seats for cooperation with the respective check valve members.

9. The machine of claim 6 wherein said check valve members are cylindrical rollers axially movably carried in cylindrical recesses in said feed screw and cooperating with seats at the ends of passages extending generally axially through said piston head; and wherein said piston head has peripheral channels of progressively decreasing circumferential width toward said nozzle which merge with the upstream ends of the respective passages.

10. In a reciprocating screw injection molding machine of the type in which rotation and axial retraction of a feed screw in the bore of a cylinder advances material through a check valve assembly in a cylindrical piston head of said screw into an axially enlarging chamber adjacent the injection nozzle of said cylinder, and in which axial advance of said feed screw in the bore of said cylinder closes said check valve assembly for ejection of the material in said chamber through said nozzle, the improvement which comprises providing the cylindrical piston head on said feed screw with peripheral channels which define with the bore of said cylinder a corresponding number of passages of progressively decreasing circumferential width toward said nozzle, said channels respectively merging with a circular series of passages extending generally parallel to one another axially through said piston head near the periphery thereof.

References Cited

UNITED STATES PATENTS

| | | | |
|---|---|---|---|
| 1,990,555 | 2/1935 | Loomis | 18—12 |
| 2,565,411 | 8/1951 | Van Buuren. | |
| 3,099,861 | 8/1963 | Gaspar et al. | 18—30 |

FOREIGN PATENTS 417,946  8/1925  Germany.

J. SPENCER OVERHOLSER, *Primary Examiner.*

W. L. McBAY, *Assistant Examiner.*